US012562541B2

(12) United States Patent
Plancherel et al.

(10) Patent No.: US 12,562,541 B2
(45) Date of Patent: Feb. 24, 2026

(54) TECHNIQUES FOR SOLDERING ON A SUBSTRATE WITH A BELOW SOLDERING TEMPERATURE MELTING POINT

(71) Applicant: Logitech Europe S.A., Lausanne (CH)

(72) Inventors: Laurent Plancherel, Lausanne (CH); Thomas Marriott-Dodington, Geneva (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/309,467

(22) Filed: Apr. 28, 2023

(65) Prior Publication Data

US 2024/0364065 A1 Oct. 31, 2024

(51) Int. Cl.
*H01R 43/02* (2006.01)
*H01B 1/02* (2006.01)

(52) U.S. Cl.
CPC ........... *H01R 43/0235* (2013.01); *H01B 1/02* (2013.01); *H01R 43/0242* (2013.01); *H01R 43/0256* (2013.01)

(58) Field of Classification Search
CPC ............ H01R 43/0235; H01R 43/0242; H01R 43/0256; H01B 1/02
See application file for complete search history.

(56) References Cited

U.S. PATENT DOCUMENTS

| | | | | |
|---|---|---|---|---|
| 2002/0134583 A1* | 9/2002 | Noble | H05K 13/0465 | 29/854 |
| 2005/0156906 A1* | 7/2005 | Chiu | G06F 3/0445 | 345/173 |
| 2007/0105304 A1* | 5/2007 | Kasai | H01L 21/563 | 438/254 |
| 2007/0152018 A1* | 7/2007 | Cachina | B23K 1/0008 | 228/101 |
| 2012/0205152 A1* | 8/2012 | Rateiczak | H05B 3/84 | 174/84 R |
| 2013/0335292 A1* | 12/2013 | Hung | H01Q 9/42 | 343/866 |
| 2014/0120401 A1* | 5/2014 | Shin | H01M 10/425 | 29/879 |

(Continued)

FOREIGN PATENT DOCUMENTS

| | | | | |
|---|---|---|---|---|
| CN | 214125629 U * | 9/2021 | | |
| JP | 2004146634 A * | 5/2004 | H05K 3/0038 | |
| KR | 100771320 B1 * | 10/2007 | H05K 1/185 | |

*Primary Examiner* — Jeffrey T Carley
*Assistant Examiner* — Jose K Abraham
(74) *Attorney, Agent, or Firm* — Kilpatrick Townsend & Stockton LLP

(57) ABSTRACT

A method for soldering to a conductor on a first substrate with a melting temperature below a soldering temperature is provided. A second substrate is attached to the first substrate around a soldering point. The second substrate is smaller than the first substrate and has a melting temperature above the soldering temperature. A soldering material is applied to the soldering point and the soldering temperature is applied to the soldering point with a soldering head smaller than the second substrate. The first substrate deforms (e.g., melts) proximate the soldering point at the soldering temperature. However, support for the first conductor is provided with the second substrate in place of the first substrate proximate the soldering point where the first substrate is deformed.

8 Claims, 14 Drawing Sheets

(56) References Cited

U.S. PATENT DOCUMENTS

| | | | | |
|---|---|---|---|---|
| 2014/0170913 A1* | 6/2014 | Degen | B23K 33/00 | |
| | | | 29/879 | |
| 2017/0110805 A1* | 4/2017 | Yoshida | B23K 1/0056 | |
| 2018/0029317 A1* | 2/2018 | Tsotsis | B29C 70/10 | |

* cited by examiner

TECHNIQUES FOR SOLDERING ON A SUBSTRATE WITH A BELOW SOLDERING TEMPERATURE MELTING POINT

BACKGROUND

Aspects of the present disclosure relate generally to soldering connections on electronic circuits, and in particular to soldering on a substrate with a low melting point.

Logitech is striving to make its products more sustainable through new designs. A problem with electronics is the difficulty of recycling printed circuit boards (PCBs). It would be desirable to have a more easily recyclable substrate, such as a plastic like polyethylene terephthalate (PET). However, the temperature required for soldering to conductors on PET will melt the PET.

There are a variety of methods to make connections with conductive traces on a substrate. These include soldering with heat, ultrasonic welding, ACF (anisotropic conductive film) bonding, hand soldering, conductive glue and conductive tape. These involve various tradeoffs of cost, electrical resistance, yield, etc.

Unless otherwise indicated herein, the materials described in this section are not prior art to the claims in this application and are not admitted to be prior art by inclusion in this section.

BRIEF SUMMARY

In some embodiments, a method for soldering to a conductor on a first substrate with a melting temperature below a soldering temperature is provided. A second substrate is attached to the first substrate around a soldering point. The second substrate is smaller than the first substrate and has a melting temperature above the soldering temperature. A soldering material is applied to the soldering point and heat is applied to the soldering point with a soldering head smaller than the second substrate. The first substrate deforms (e.g., melts) proximate the soldering point at the soldering temperature. However, support for the first conductor is provided with the second substrate in place of the first substrate proximate the soldering point where the first substrate is deformed.

In some embodiments, the first substrate is polyethylene terephthalate (PET), the second substrate is a polyimide (e.g., Kapton® tape) and the first conductor is a copper trace. The Kapton® tape is attached to the copper trace and the PET using an adhesive.

In some embodiments, there is a depression in the first conductor at the soldering point to provide a multi-dimensional surface where solder can attach more securely. In embodiments, the depression is a via extending through the first substrate to a second conductor on a second side of the first substrate opposite the first conductor. The first conductor is connected to the second conductor with the via at the soldering point.

In some embodiments, a third substrate (e.g., PCB) with a soldering pad is attached to the first substrate so that the soldering pad is aligned with the soldering point. The soldering material attaches to the soldering pad. The soldering connection can be strengthened with the inclusion of a via, which can also aid the application of the solder material.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

In some embodiments, a more sustainable substrate than a PCB, such as PET, can be used for conductors (e.g., copper) even though it melts at soldering temperatures. FIG. 1D shows a PET film 102 with conductive traces 104-110. A second substrate 114 (e.g., a polyimide) is attached to the first substrate around a soldering point(s). Second substrate 114 has a series of holes 116-122 exposing the soldering points on the conductive traces. When soldering material and heat is applied, the first substrate 102 melts around the soldering points, but the second substrate is adhered to the conductive traces and provides the substrate for the conductive traces where the first substrate melted away. Thus, the less sustainable second substrate is sparingly used only in the immediate area of the solder points.

First Embodiment

Figure 1A:
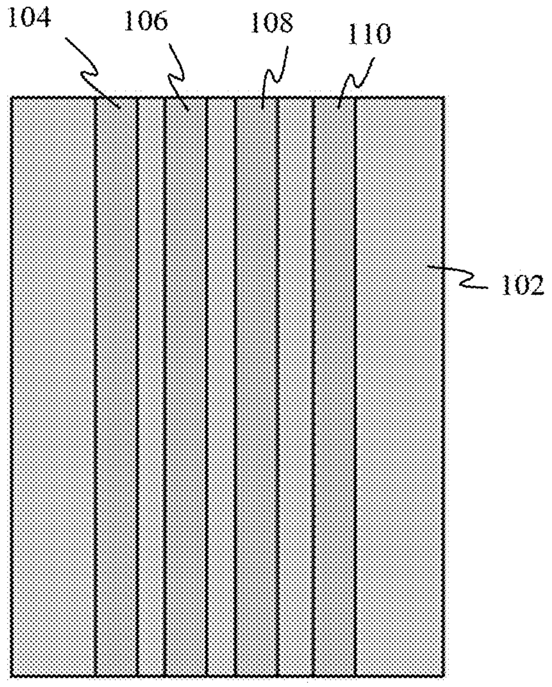
FIGS. 1A-D are diagrams illustrating assembly steps for preparing a melting substrate for soldering onto conductor traces using a reinforcing substrate, according to embodiments.
Figure 1B:
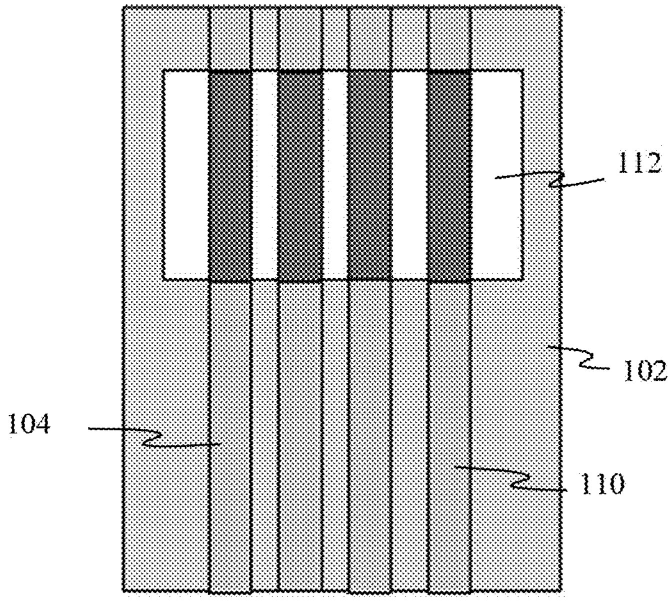
Figure 1C:
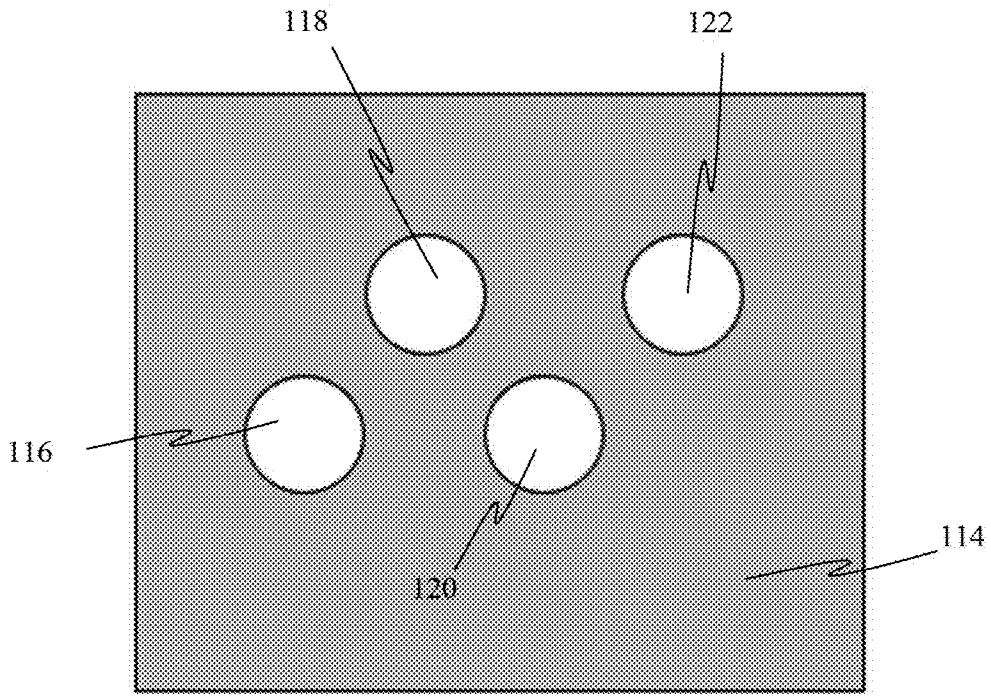
Figure 1D:
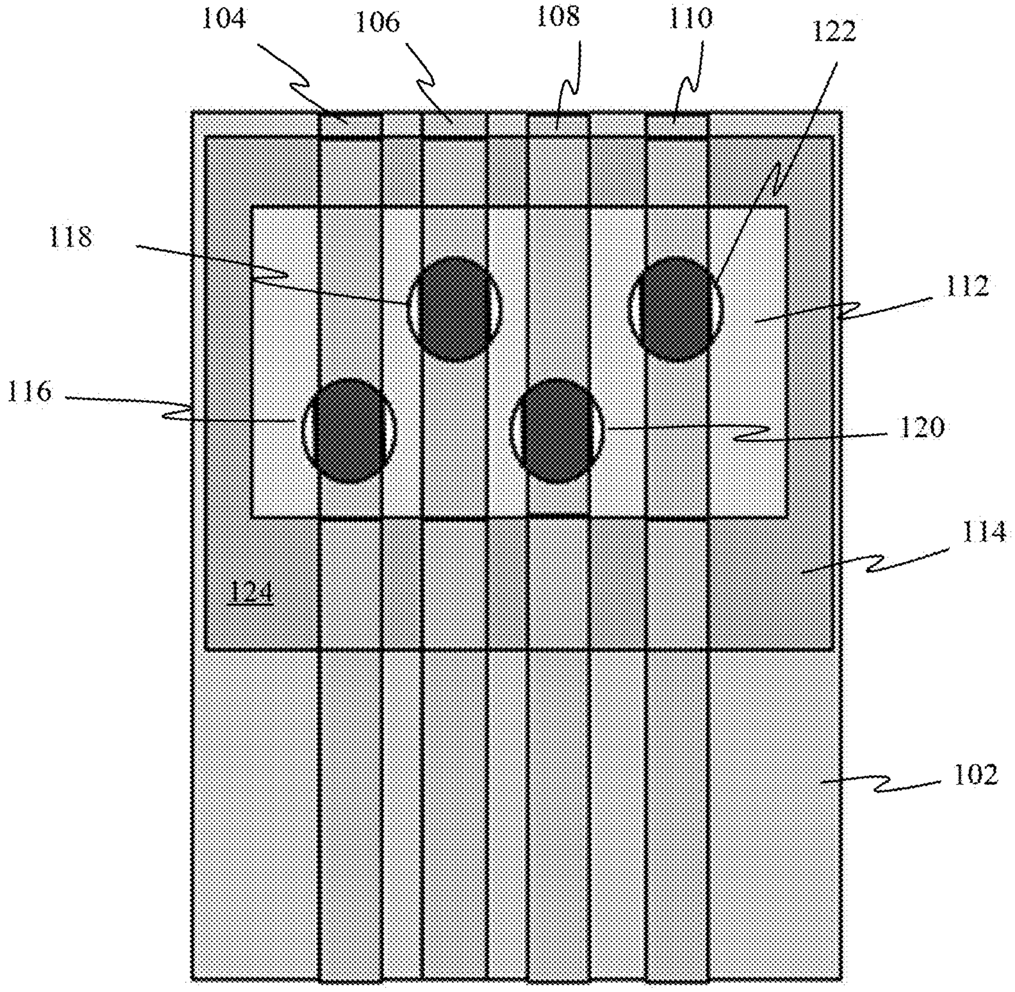

FIGS. 1A-D are diagrams illustrating assembly steps for preparing a substrate (that will melt) for soldering onto conductor traces using a reinforcing substrate, according to embodiments. FIG. 1A shows conductive traces (e.g., copper) 104, 106, 108 and 110 formed on a first substrate 102 with a melting temperature below a soldering temperature. In one embodiment, first substrate 102 is a flexible substrate such as polyethylene terephthalate (PET).

FIG. 1B shows an embodiment with an opening 112 opened in substrate 102 to expose the conductive traces. The traces could be provided more support in this embodiment by using a double-sided substrate with PET in between each layer.

FIG. 1C illustrates a second substrate 114 (e.g., polyimide film, such as Kapton® film). This second substrate does not melt at soldering temperatures. Substrate 114 has a series of holes 116, 118, 120 and 122 for exposing multiple soldering points on conductive traces. Polyimide film is used in one embodiment because it has good thermal properties. It has a high melting point and can be used over a range of −269° C.-350° C. It also has a high tensile strength, high resistance to creep, but-through, abrasion, solvents and chemicals. It has a high dielectric strength which makes it an excellent insulating material. It is also flame retardant.

FIG. 1D illustrates second substrate 114 placed over opening 112 with an adhesive attaching it to first substrate 102 in an overlapping portion 124. As can be seen, holes 116-122 in second substrate 114 expose conductive traces 104-110 so that solder can be applied in the holes. A bar soldering head can be used that is smaller than, the same size, or slightly larger than opening 112. The heat of the soldering head will melt portions of first substrate 102 that are close to the soldering head. However, second substrate 114 supports the conductive traces in overlap region 124 where first substrate 102 will melt. The portions of substrate 102 outside second substrate 114 are far enough from the heat of the soldering head so that they do not melt. For a first substrate that is PET, typically, only the PET within about 2-3 mm of the soldering head melts. Thus, the second substrate should extend for at least 2-3 mm beyond the area where the soldering head is located. Instead of a soldering bar, a soldering head that heats a series of points could be used, and would cause less widespread melting. However, such a system needs more precision, and thus results in more expensive manufacturing. The second substrate should also be at least the width of the conductive traces on each side of the conductive trace to provide sufficient mechanical support.

In one embodiment, the first substrate is PET, the second substrate is a Kapton® film, and the conductive traces are copper. The temperature required for soldering is typically about 250 degrees C. PET melts at approximately 80 degrees C. (glass point) and Kapton® tape (polyimide) melts at approximately 400 degrees C. Thus, PET will melt at the soldering temperature, but the Kapton® tape will not.

In an alternate embodiment, the opening 112 is sufficiently large, and the soldering head correspondingly small, so that the portions of first substrate 102 in overlap region 124 do not melt. Thus the second substrate 114 will be in direct contact with a PCB (not shown) in the opening zone 112 in the areas around the copper traces.

The method and structure of FIGS. 1A-D allow the use of a thinner first substrate that thus produces less waste when disposed of. In addition, a recyclable material such as PET can be used. Additionally, this provides a method to use a film with less conductor material (e.g., copper). The film shown in FIG. 1 can be made by a process that deposits the traces, and thus only the trace material is used. In a typical printed circuit board (PCB) process, the entire process is coated with the conductor, and the parts where no conductor is desired are etched away, creating wasted copper and using more chemicals for the etching. Such a film has no practical use absent a way to solder and maintain the conductive traces intact when the film melts, as provided by embodiments of the present invention.

Second Embodiment

Figure 2A:
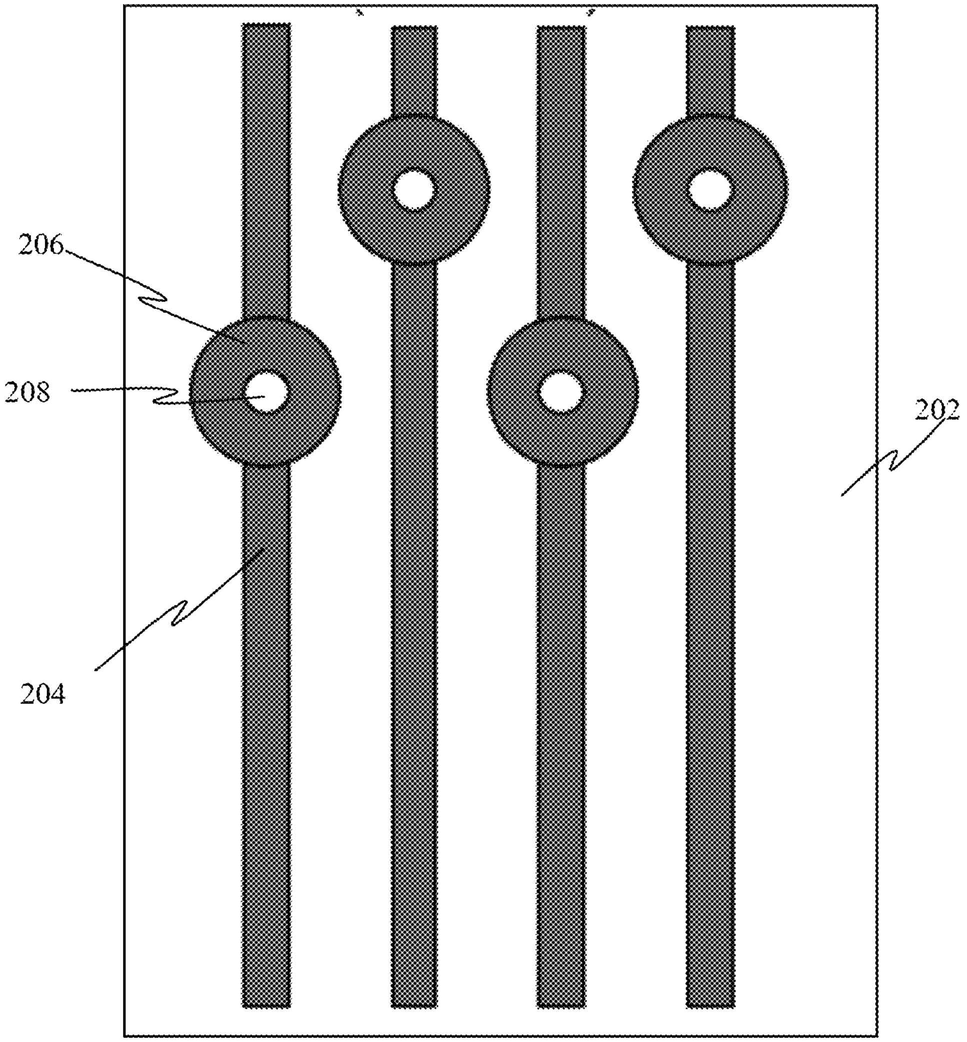
FIGS. 2A-B are diagrams illustrating assembly steps for preparing a melting substrate for soldering onto conductor contacts with vias using a reinforcing substrate, according to embodiments.
Figure 2B:
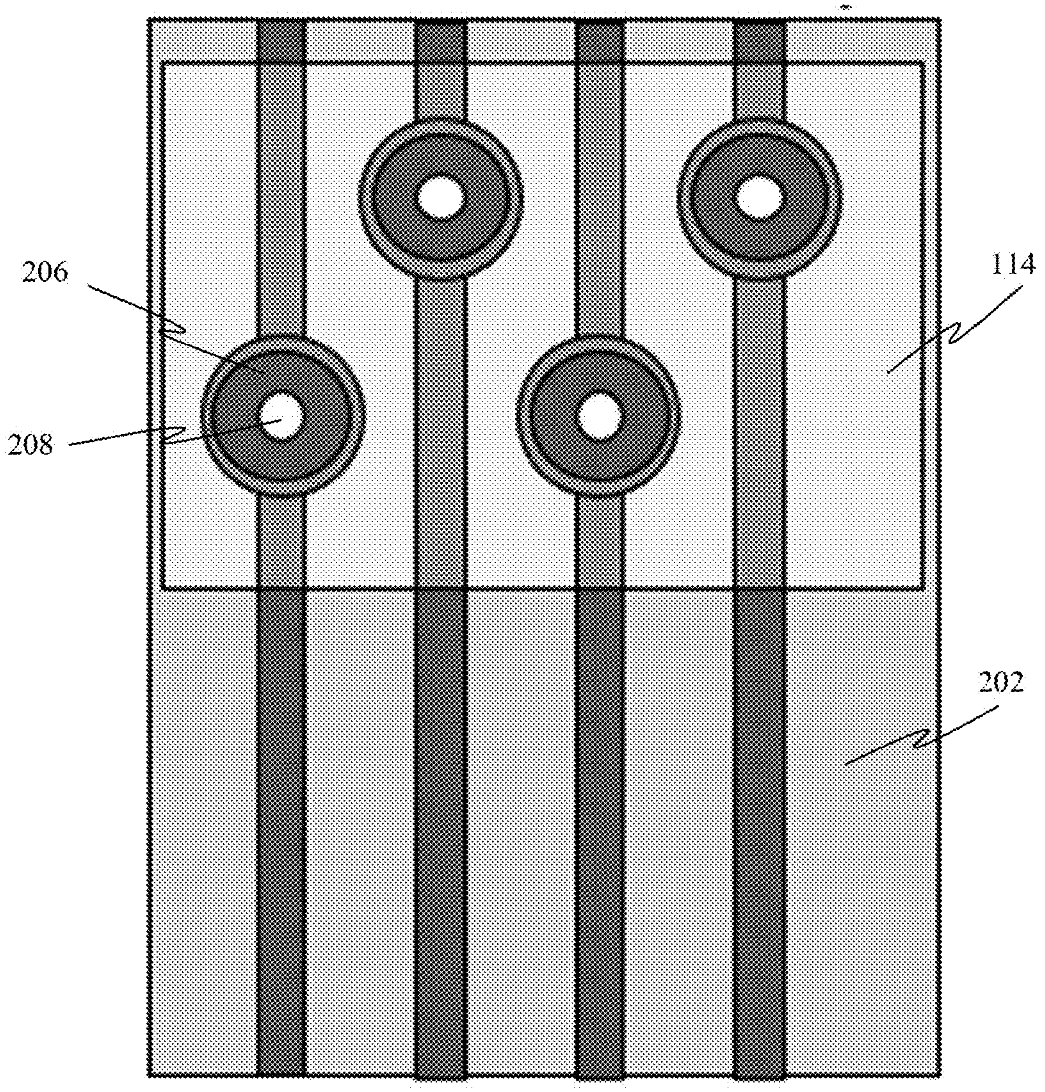

FIGS. 2A-C are diagrams illustrating assembly steps for preparing a substrate (that will melt at soldering temperature) for soldering onto conductor contacts with vias using a reinforcing substrate, according to embodiments. FIG. 2A shows a first substrate 202 with multiple traces 204, similar to that shown in FIG. 1A. However, contact areas 206 are added, with a via 208 forming a hole through substrate 202 to a trace on the other side of substrate 202. The vias are plated and the holes in the vias are large enough to let solder flow through. In one embodiment, holes with at least 0.4 mm diameter or larger are used. Having plated vias helps solder flow through the hole. The bottom layer of conductors enlarges the soldering surface and improves the mechanical stability of the soldered product. The conductive traces (tracks) are made long enough so that even after the solder point there is mechanical stability.

In an alternate embodiment, a single-sided substrate is used, with traces on only one side. The circular contact areas 206 are still used, with an optional depression or hole, not necessarily a via extending all the way through the substrate. Such a hole enables the solder to better connect to the conductive trace.

The second substrate 114 of FIG. 1C is then applied. In embodiments, the second substrate is a film or tape with an adhesive layer so that it will stick to the first substrate and the conductive traces. The resulting combination is shown in FIG. 2B. The second substrate 114 is resistant to solder heat. It has holes for soldering points, to apply solder and heat. In one embodiment it is a tape, with an adhesive that sticks to the upper copper tracks on the first substrate, and to the first substrate around the solder points. These tracks will remain in place, even if the original substrate (PET) is destroyed by heat. In embodiments, the first substrate, with its local second substrate overlay, is aligned on an electronic board as shown in more detail in FIGS. 3A-F described below. An adhesive between the electronic board and the first substrate will ensure a good mechanical stability in all places where substrate was not melted by the soldering process. In the soldering process, solder is applied and melted, either point by point (manually) or globally (hot bar soldering process). Zones where heat is applied will suffer from a melted first substrate. Therefore, it is important that the second substrate (e.g., Kapton® tape) and the adhesive are large enough to provide mechanical stability up to areas where the first substrate was not melted. In some embodiments, the width of second substrate 114 is greater than substrate 202, so that it will have direct contact with the PCB surface below.

In embodiments, the methods describe herein are applicable to either single or double layer membranes. The above-described figures show solder points aligned in zigzag, to reduce overall pitch. They can also be aligned linearly, or can be any other pattern, such as much further separated solder points. By using Kapton® tape placed locally, costs are reduced since Kapton® tape is widely available and cheaper than PCBs. The methods described herein allow for standard soldering methods, thus eliminating the need to design special soldering equipment and methods. The first substrate can alternately be any material that would melt/deform/degrade with heat (not limited to PET).

In embodiments, the openings in the second substrate (e.g., Kapton® tape) are kept small for better mechanical stability. In addition, the Kapton® tape may overlap the PET substrate and attach directly to an electronic board for better mechanical stability.

Assembly for Two-Sided Film

FIGS. 3A-F are diagrams illustrating assembly steps for soldering the assemblies of FIG. 1D or 2B onto a PCB, according to embodiments. A PET substrate can be used for various purposes that need to be connected to a PCB containing other circuitry or connectors. For example, embodiments can be used to produce charging coils on PET, which are then connected to a PCB containing connectors and/or semiconductor chip packages. FIGS. 3A-F illustrate an embodiment of the above-described soldering processes that use the solder to connect to a PCB conductor.

Figure 3A:
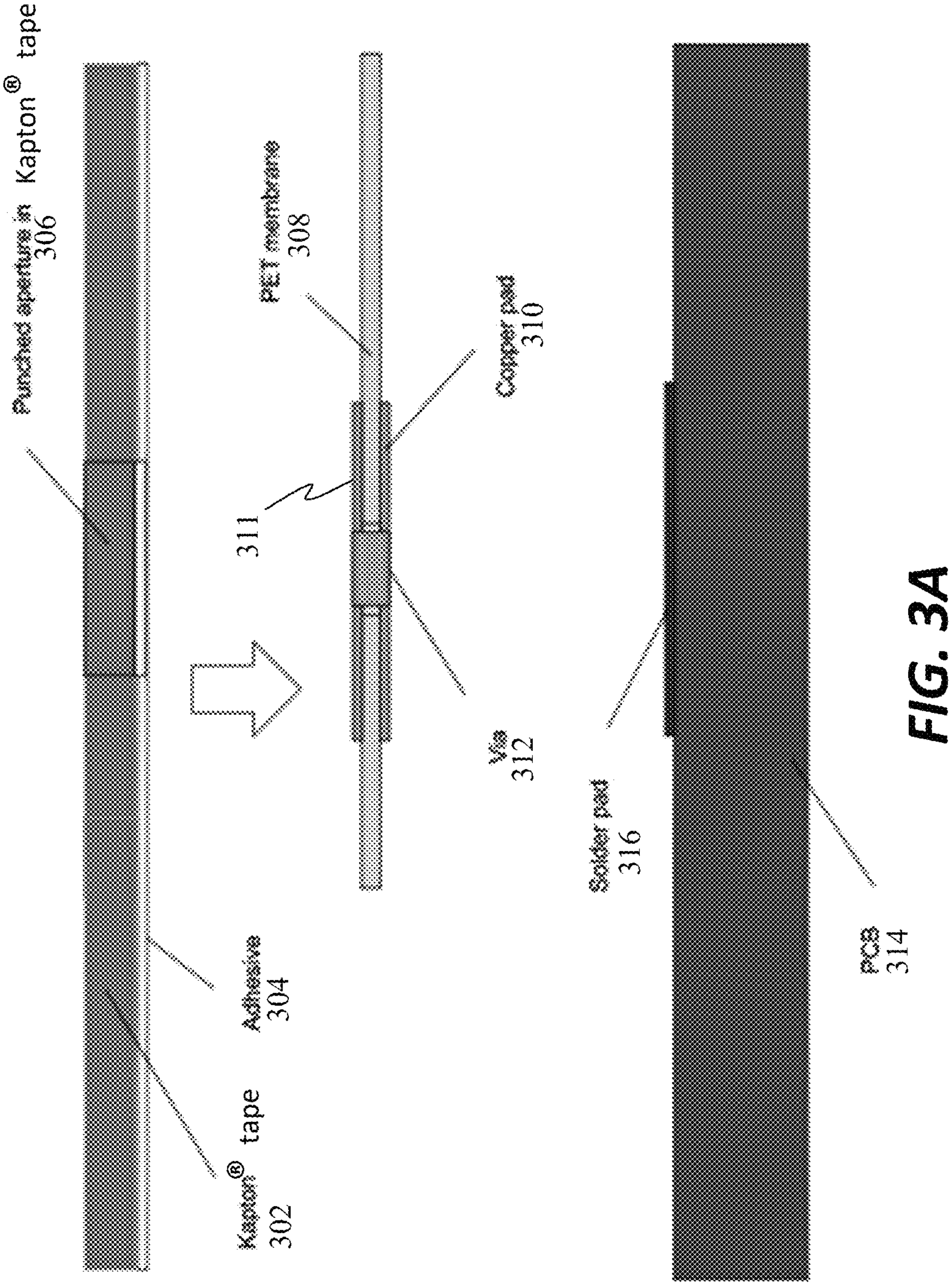
FIGS. 3A-F are diagrams illustrating assembly steps for soldering the assemblies of FIG. 1D or 2B onto a PCB, according to embodiments.

FIG. 3A is a cross-sectional diagram illustrating a PET membrane 308, Kapton® tape 302 and PCB 314 aligned for assembly. Kapton® tape 302 has an opening or aperture 306 and an adhesive layer 304. PET membrane 308 has copper pads 310 and 311 on the bottom and top of the PET membrane, connected by a via 312. PCB 314 has a solder pad 316. In one embodiment, the solder pad 316 is copper. The aperture 306 is aligned over copper pad 311, which in turn is aligned over solder pad 316 on PCB 314. As indicated by the arrow, in a first step the Kapton® tape 302 is attached to PET membrane 308 using adhesive 304.

Figure 3B:
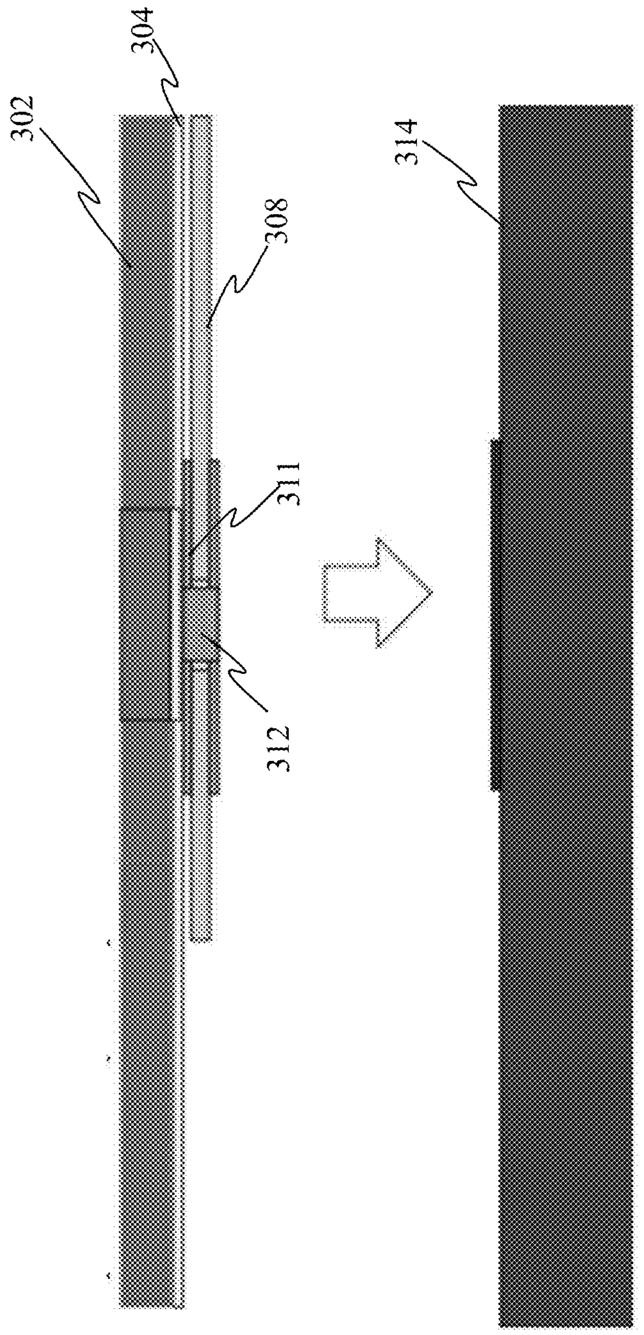

FIG. 3B is a cross-sectional diagram illustrating Kapton® tape 302 adhered to PET membrane 308 with adhesive layer 304. In embodiments, this step is performed first, then the assembly of Kapton® tape 302 and PET membrane 308 is aligned with PCB 314. As indicated by the arrow, the assembly of Kapton® tape 302 and PET membrane 308 is attached to PCB 314 with the portion of the adhesive that extends beyond PET membrane 308. Optionally, additional adhesive can be used locally near the solder pads on PCB 314, or on PET membrane 308. In an alternate embodiment, the PCB 314 is attached to PET membrane 308 first, then the combination is attached to Kapton® tape 302.

Figure 3C:
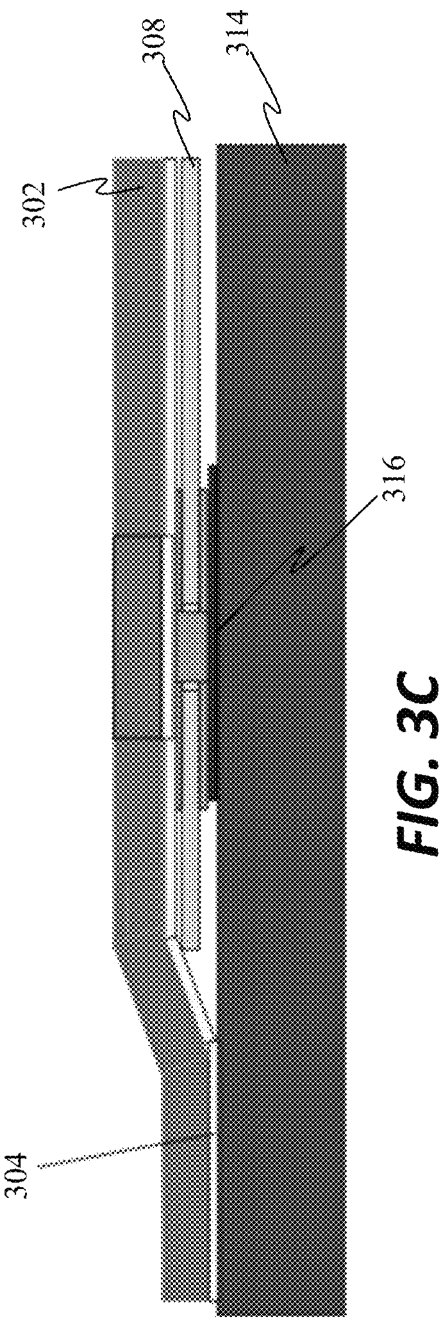

FIG. 3C is a cross-sectional diagram illustrating Kapton® tape 302 adhered to PCB 314 with adhesive layer 304. The adhesive layer 304 holds both Kapton® tape 302 and PET membrane 308 in alignment with PCB 314 during the soldering process. This is a cross-sectional view, not showing the adhesive on two other sides of solder pad 316 in certain embodiments.

Figure 3D:
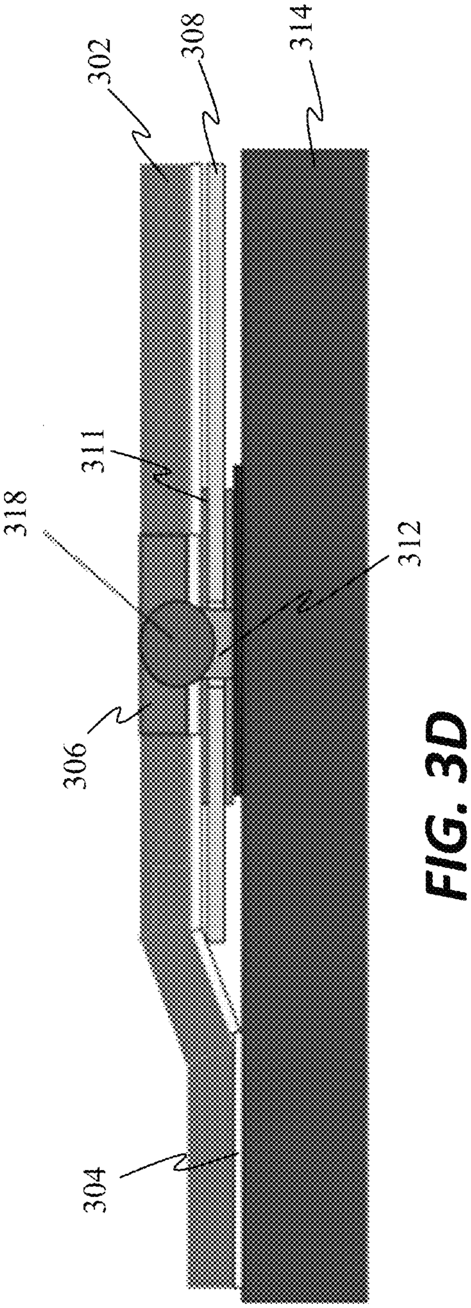

FIG. 3D is a cross-sectional diagram illustrating a solder ball 318 placed through aperture 306 to contact copper pad 311 and via 312. In one embodiment, solder ball 318 is a copper-tin rosin core solder.

Figure 3E:
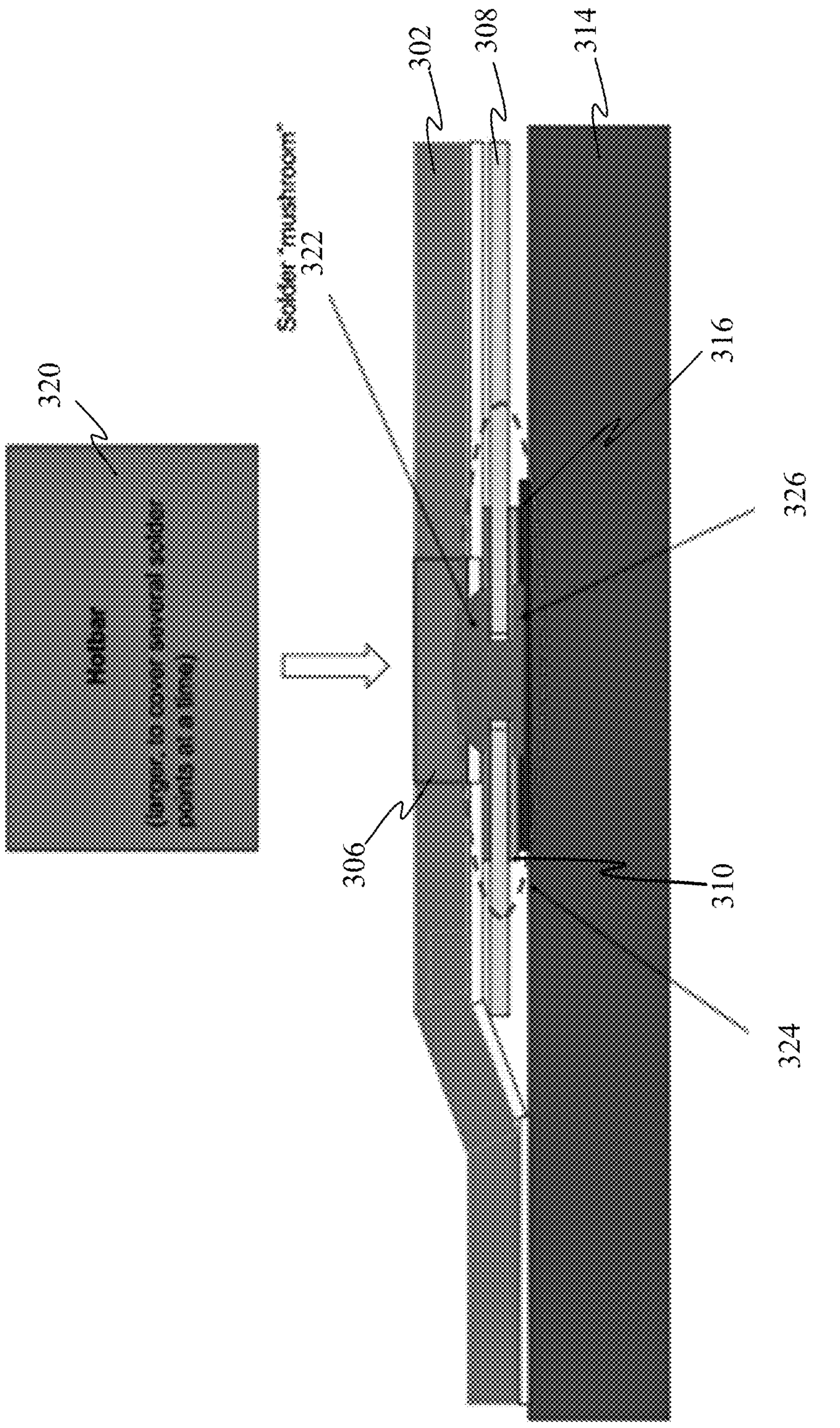

FIG. 3E is a cross-sectional diagram illustrating the soldering action. A soldering head, hotbar 320, is applied to an area larger than aperture 306, and is large enough to cover several other solder points (not visible in the cut-way view) at once. The heat from the solder head will extend through a high temperature zone (melting zone) indicated by dotted lines 324. The heat from the solder head will melt the solder ball, forming a mushroom shape 322 above copper pad 311. The solder will also melt and migrate to between copper pad 310 solder pad 316 by means of capillary action. A portion of PET membrane 308 within melting zone 324 will melt, leaving the copper pads 310, 311, and the adjacent connecting copper traces, supported by Kapton® tape 302 and its adhesive layer, instead of PET membrane 308.

Figure 3F:
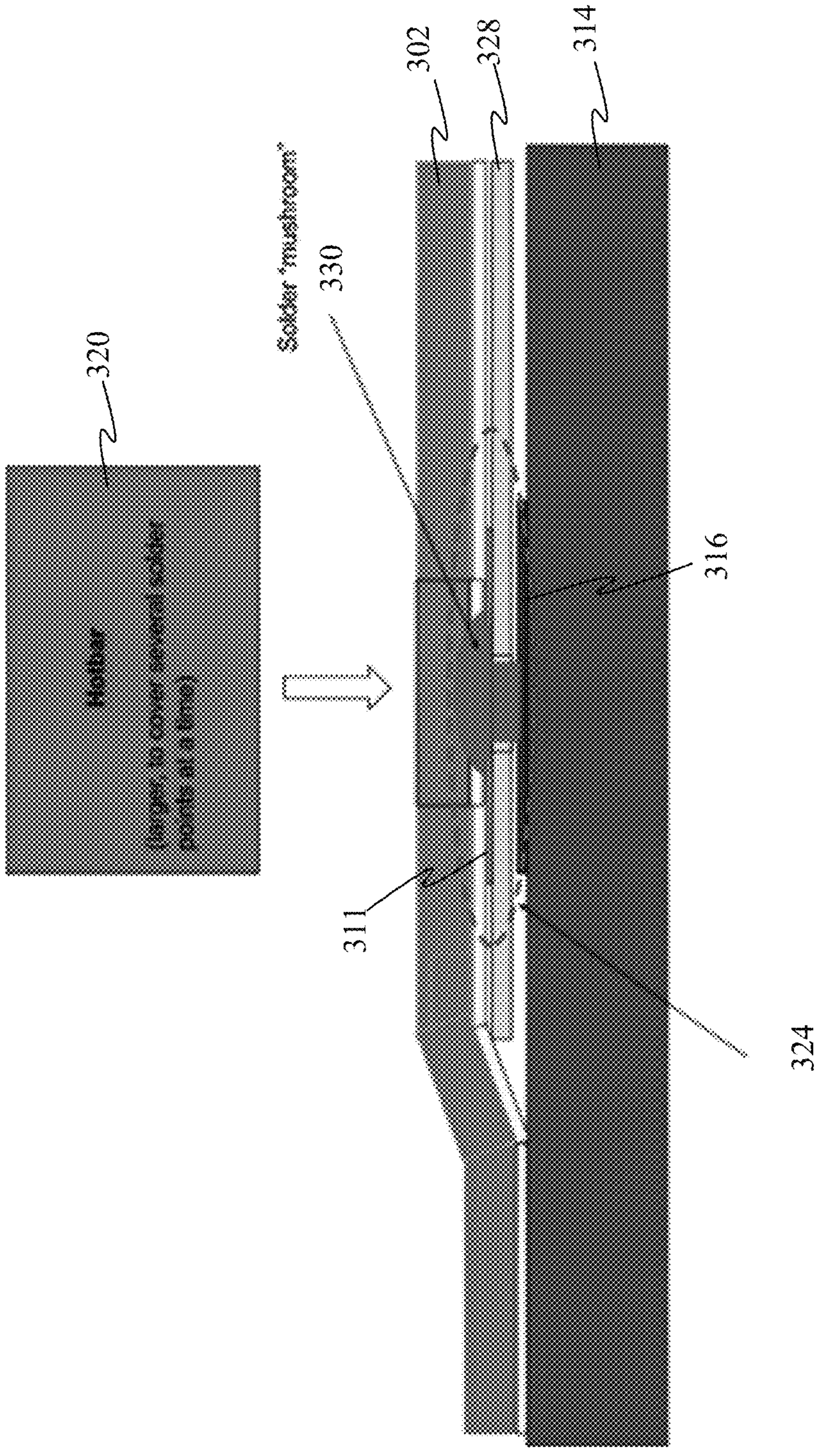

FIG. 3F is a cross-sectional diagram illustrating the soldering action for a PET membrane 328 with only single-sided traces, and thus no contact pad 310 on the bottom of PET membrane 318. The solder mushroom 330 extends over the top contact 311 and through a via to PCB pad 316.

In one embodiment, for the various embodiments described above, Kapton® tape 302 is 0.05-0.1 mm thick, PET membrane 328 is 0.02-0.1 mm thick, and PCB 3134 is 0.5-1.5 mm thick.

In an alternative embodiment, a second Kapton® tape and adhesive is attached to the bottom of the PET membrane, between the PET membrane and the PCB. The second Kapton® tape has an opening to expose solder pad 316 and the via. The second Kapton® tape adds additional mechanical support for the copper traces, which may be desirable in some applications. In one embodiment, the second Kapton® tape between the PET membrane and PCB is thinner than the first Kapton® tape.

Figure 4:
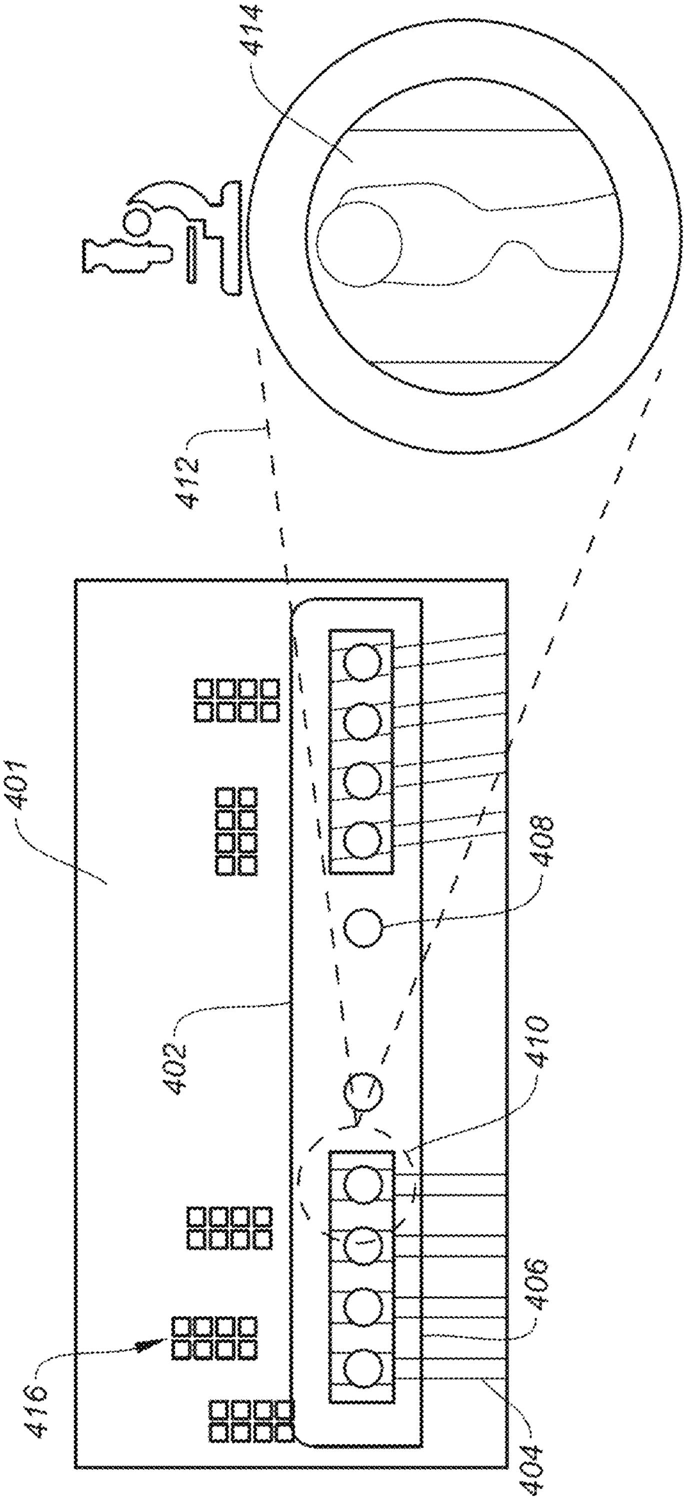
FIG. 4 is a photo of a final product from the assembly of FIGS. 3A-F, according to embodiments.

FIG. 4 is a photo of a final product from the assembly of FIGS. 3A-E, according to embodiments. A PET membrane 401 has a Kapton® tape 402 over it, with holes such as hole 408 exposing copper traces 404 in an area 406 where a solder bar is applied. Area 410 is expanded as shown by dotted lines 412 to show the solder connection 414 as shown under a microscope. Also shown in this embodiment are tuning capacitors 416 for an embodiment with a coil where tuning capacitors are needed.

Assembly Flowchart

Figure 5:
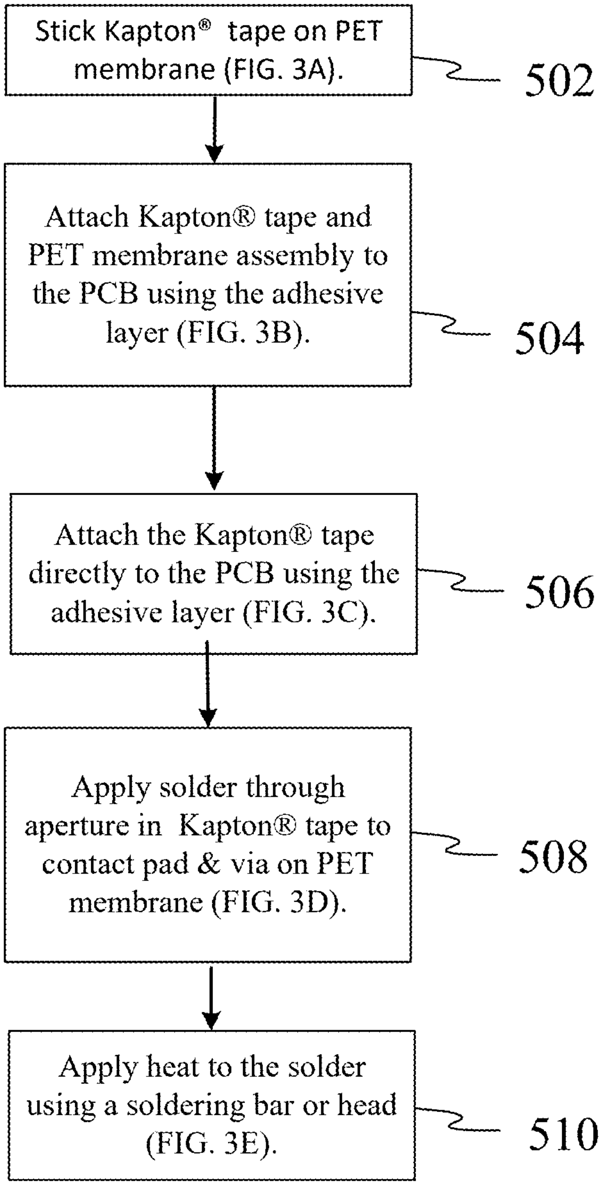
FIG. 5 is a flowchart illustrating the method of assembly of FIGS. 3A-F, according to embodiments.

FIG. 5 is a flowchart illustrating the method of assembly of FIGS. 3A-E, according to embodiments. In step 502, the process sticks Kapton® tape on a PET membrane as illustrated by the arrow in FIG. 3A. In step 504, the Kapton® tape and PET membrane assembly is attached to the PCB using the adhesive layer, as shown in FIG. 3B. In step 506, pressure is applied to attach the Kapton® tape directly to the PCB using the adhesive layer, as shown in FIG. 3C. In step 508, solder is applied through the aperture in the Kapton® tape to the contact pad and the via on the PET membrane, as shown in FIG. 3D. In step 510, heat is applied to the solder using a soldering bar or head, as shown in FIG. 3E.

Figure 6:
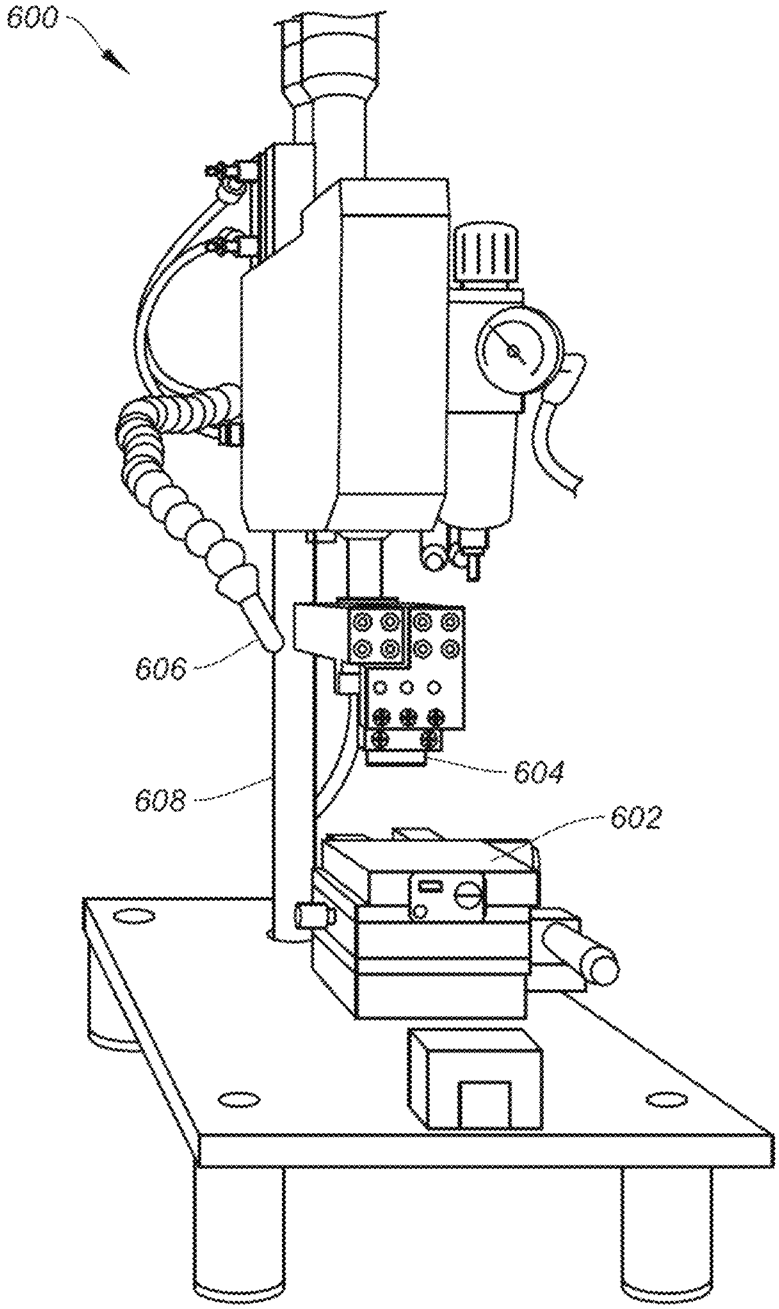
FIG. 6 is a diagram illustrating a bar soldering machine used for the assembly described in FIGS. 1-3.

FIG. 6 is a diagram illustrating a hot bar soldering machine used for the assembly described in FIGS. 1-3. A platform 602 holds the assembly to be soldered in the correct alignment. A soldering bar 604 is supported by an apparatus 606 which provides electrical current for heating soldering bar 604 and moves up and down on a support pole 608. The bar is moved downward to solder, then moved upward and the platform moves (or the soldering bar moves) over to the next set of soldering points. FIG. 6 is just one example of a soldering machine. A variety of different machines could be used with embodiments of the present invention, including point soldering heads.

Example Product

Figure 7:
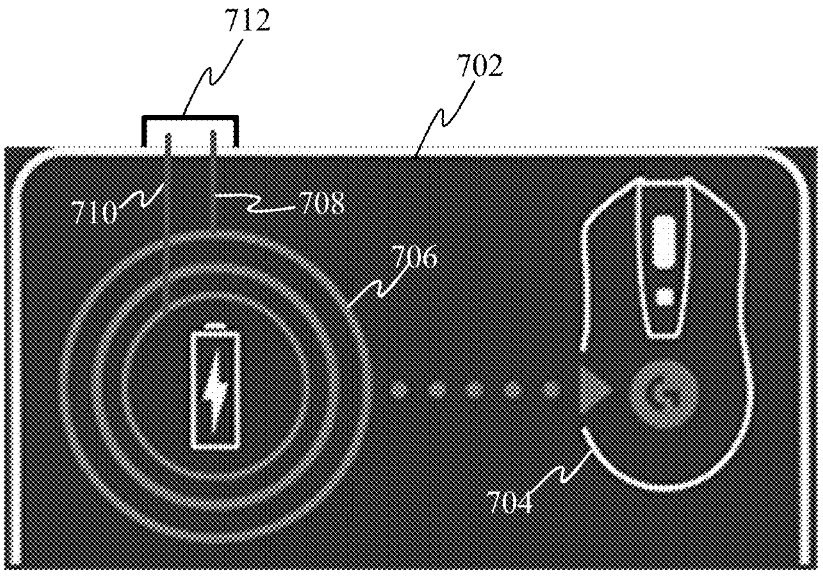
FIG. 7 is a diagram illustrating an example product incorporating the assembly of FIGS. 3A-F, according to embodiments.

FIG. 7 is a diagram illustrating an example product incorporating the assembly of FIGS. 3A-F, according to embodiments. A charging pad 702 for a mouse 704 is shown. Embedded in the pad are charging coils 706, with connector traces 708 and 710 connecting to a PCB in a connector 712. The coils 706 and connector traces 708, 710 are copper formed on a PET substrate and soldered to the PCB in connector 712 as described in the embodiments set forth above. In embodiments, the coils are copper tracks with a thickness up to 100 um, or 15-30 um in one embodiment to limit the amount of copper for sustainability and cost reasons. The copper traces are grown by an additive method onto the PET substrate which is about 20 um thick, or 15-30 um thick. Tracks can be grown on both sides of the substrate, and copper plated vias can connect these two layers.

The charging pad of FIG. 7 is just one example of a product in which embodiments of the present invention could be used. The present invention can be used in any electronics product with a PCB or flexible substrate with traces that need to be soldered. This includes mice, keyboards, trackballs, gamepads, steering wheels, headphones, joysticks and other peripheral devices, as well as computers, tablets, smartphones and other computing devices. Embodiments may be used in various components of such devices, such as screens/displays and wireless charging or communication coils (e.g., NFC coils).

Alternate Embodiments

In alternate embodiments, thin copper wire can be used instead of copper traces. Flexible membranes other than PET could be used, such as more sustainable materials made from biomass. Other examples include bio-PET, recycle rPET, poly(ethylene 2,5-furandicarboxylate) (PEF), poly (trimethylene 2,5-furandicarboxylate) (PTF), lignin-based thermoplastic polymers, (Bio) degradable aliphatic polyesters and poly(lactic acid) (PLA). The second, supporting substrate could be something other than polyimide, such as a different heterocyclic polymer. Also, other types of polyimides than Kapton® tape could be used, such as $3^{rd}$ generation polyimides with additives, filled polyimides or low-flow polyimides.

In addition to soldering traces, the techniques described herein could be used to solder semiconductor package pins to a substrate, with the second substrate being attached to the area for the chip package and extending a few millimeters beyond the connector holes for the package pins.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all the features and advantages set forth herein, are also within the scope of this disclosure. Accordingly, the scope of the present disclosure is intended to be defined only by reference to the appended claims.

The system or systems discussed herein are not limited to any particular product, hardware architecture or configuration. Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process steps may be omitted in some embodiments. The methods and processes described herein are also not limited to any particular sequence, and the steps or states relating thereto can be performed in other sequences that are appropriate. For example, described steps or states may be performed in an order other than that specifically disclosed, or multiple steps or states may be combined in a single step or state. The example steps or states may be performed in serial, in parallel, or in some other manner. Steps or states may be added to or removed from the disclosed examples. Similarly, the example systems and components described herein may be configured differently than described. For example, elements may be added to, removed from, or rearranged compared to the disclosed examples.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for soldering comprising:

providing a first conductor on a first substrate, the first substrate having a melting temperature below a soldering temperature and extending to a soldering point;

providing a second substrate, smaller than the first substrate, and having a melting temperature above the soldering temperature;

attaching the second substrate to the first conductor around a soldering point with an adhesive, wherein the second substrate has an opening aligned with the soldering point;

applying a soldering material to the soldering point;

heating the soldering material with a soldering head smaller than the second substrate; and melting the first substrate proximate the soldering point with the heating, while the second substrate, attached to the first conductor with the adhesive, providing support for the first conductor in place of the first substrate proximate the soldering point where the first substrate is melted;

providing a depression in the first conductor at the soldering point, wherein the depression is a via;

providing a third substrate with a soldering pad;

attaching the third substrate to the first substrate so that the soldering pad is aligned with the soldering point; and causing the soldering material to attach to the soldering pad through the via;

wherein the third substrate is a printed circuit board (PCB); and attaching another second substrate to the first substrate between the first substrate and the PCB, the another second substrate having an opening around the soldering pad.

2. The method of claim 1 wherein the first substrate is polyethylene terephthalate (PET) tape, and the second substrate is only attached to the first substrate around the soldering point.

3. The method of claim 1 wherein the second substate is polyimide.

4. The method of claim 1 wherein the first conductor is copper.

5. The method of claim 1 wherein the depression is a via and further comprising:

providing a second conductor on a second side of the first substrate opposite the first conductor; and connecting the first conductor to the second conductor with the via at the soldering point.

6. A method for soldering comprising:

providing a first copper conductor on a polyethylene terephthalate (PET) film, the PET film having a melting temperature below a soldering temperature and extending to a soldering point;

providing a via through the PET film connected to the first copper conductor;

providing a second copper conductor on a second side of the PET film opposite the first copper conductor;

connecting the first copper conductor to the second copper conductor with the via at a soldering point;

providing a polyimide substrate, smaller than the PET film, and having a melting temperature above the soldering temperature;

attaching the polyimide substrate to the first copper conductor and the PET film around the soldering point with an adhesive;

providing a printed circuit board (PCB) with a soldering pad;

attaching the PCB to the second side of the PET film so that the soldering pad is aligned with the soldering point;

applying a soldering material to the soldering point;

heating the soldering material with a soldering head smaller than the polyimide substrate;

causing the soldering material to attach to the soldering pad through the via;

melting the PET film proximate the soldering point with the heating, with the second substrate, attached to the first and second copper conductors with the adhesive, providing support for the first and second copper conductors with the polyimide substrate in place of the melted PET film proximate the soldering point where the PET film is melted.

7. The method of claim 6 wherein the second substrate extends beyond the first conductor by between 2-5 mm.

8. The method of claim 6 wherein the soldering head is a soldering bar that heats multiple soldering points.

* * * * *